S. McAULEY.
PROJECTING APPARATUS FOR MOTION PICTURE MACHINES.
APPLICATION FILED JULY 23, 1914.
1,133,869.
Patented Mar. 30, 1915.
2 SHEETS—SHEET 1.
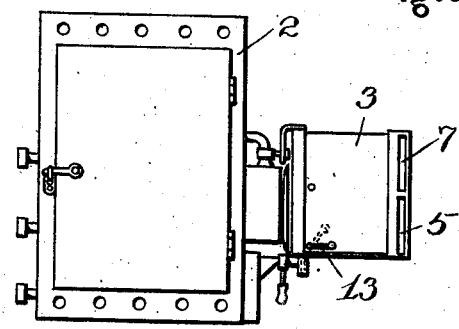
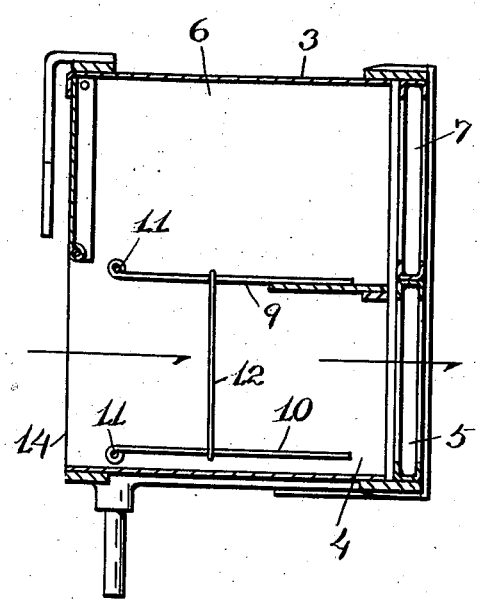
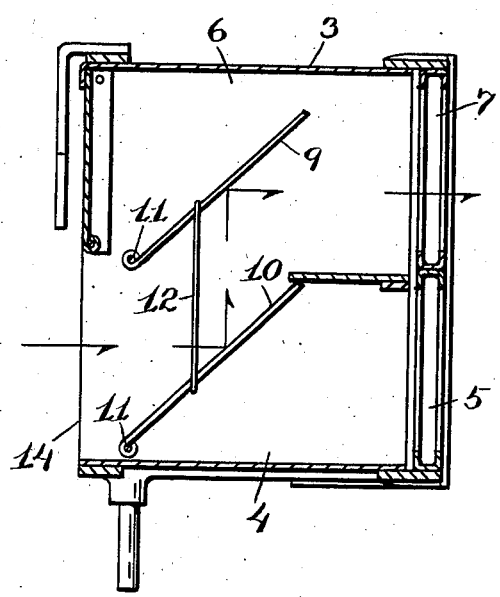

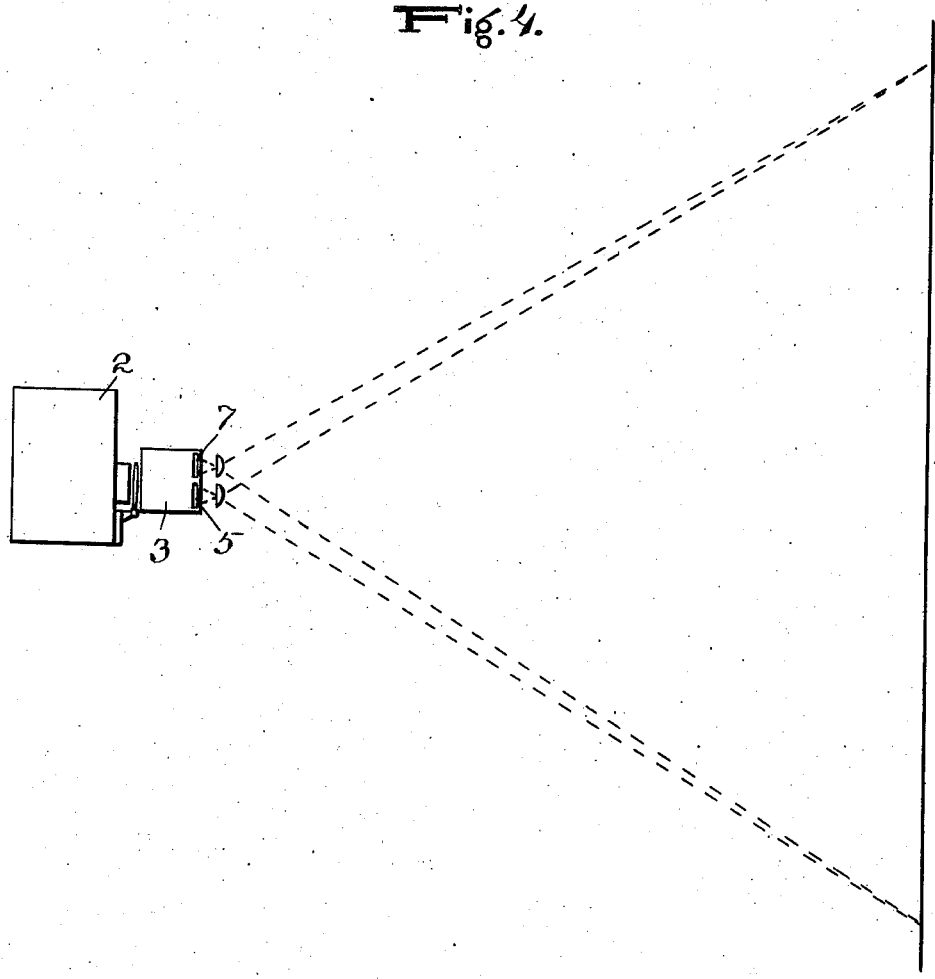

UNITED STATES PATENT OFFICE.

SHERRY McAULEY, OF ATLANTA, GEORGIA.

PROJECTING APPARATUS FOR MOTION-PICTURE MACHINES.

1,133,869.      Specification of Letters Patent.      Patented Mar. 30, 1915.

Application filed July 23, 1914. Serial No. 852,645.

*To all whom it may concern:*

Be it known that I, SHERRY McAULEY, a citizen of the United States, resident of Atlanta, in the county of Fulton and State of Georgia, have made a certain new and useful Invention in Projecting Apparatus for Motion-Picture Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied. Fig. 2 is a central vertical section of the invention, with the mirrors in inactive position. Fig. 3 is a similar view with the mirrors turned to active position. Fig. 4 is a side view of the invention as applied, partly diagrammatic, showing the screen, and the paths of the rays of light in dotted lines.

The invention has relation mainly to motion picture apparatus, having for its object the provision of improved means whereby a change from one picture to another and radically different picture, located the one above the other (as for instance the change of a pumpkin into a chariot, or a man into an animal) may be effected, the one picture dissolving, as it may be termed, into the other.

The invention consists in the novel construction and combinations of parts, as hereinafter set forth.

In the accompanying drawings, illustrating the invention, the numeral 2 designates the lamp house of a motion picture machine, to which the invention is shown as applied, the casing 3 of the dissolver being usually substituted for the cone of said lamp house, and including a lower chamber 4, through which the light rays of the lamp normally pass in straight unobstructed manner, as shown by the arrows, Fig. 2, to throw upon the screen the picture located upon a suitable slide or film in the slideway or passage 5 at the front of said chamber. The upper chamber 6 of said casing has at the front thereof also a slideway or passage, numbered 7, wherein is located the picture into which is to be dissolved the first-named picture of the lower chamber.

9 and 10 designate parallel reflectors, forming normally the upper and lower walls of said lower chamber, said reflectors being each hinged in rear at 11 and having a link connection 12 to move in parallel relation.

When the lower picture is to be changed or dissolved into the upper picture, the reflectors are moved, usually by a crank handle 13 upon the pivot rod of one of the reflectors, until they assume an angle of about forty-five degrees, being still in parallel. The light rays from the lamp entering the open rear end 14 of the lower chamber will now strike the interposed lower reflector, being then reflected straight upwardly to the upper reflector, and thence straight out through the upper picture to the screen, as shown by the arrows, the lenses for enlargement being suitably located with relation to the pictures so that the enlargements of the two pictures thus successively thrown upon the screen will substantially register, and, the light being gradually cut off from the lower picture by the interposed lower reflector and gradually given to the upper picture by the movement of the reflectors, the illusion of the change is complete.

The lower picture may be located upon a slide, as in a stereopticon, and the upper picture upon a similar slide. Or the lower picture may be one of a series upon a moving picture film, passing through the lower passage.

What I claim is:

1. In projecting apparatus, a means for dissolving one image into another, consisting of a pair of normally inactive opposite mirrors located at the sides of the normal path of the light rays from a lamp of said apparatus, and means for moving said mirrors in parallel through inclined positions to gradually bar an increasing number of said rays from their first path and reflect them along another and different path.

2. In projecting apparatus, a means for dissolving one image into another, consisting of a pair of normally inactive opposite pivoted parallel mirrors having a link connection and located at the top and bottom of the normal path of the light rays from a lamp of said apparatus, and a crank arm upon the pivot rod of one of said mirrors for moving the mirrors in parallel gradually through inclined positions to accomplish the result stated.

3. In projecting apparatus, the combination with a lamp house having a lamp and a condenser lens, of an attachment including a casing provided with a lower chamber in line with said condenser lens and in the normal path of the rays from said lamp, and an upper chamber, transverse passages in line with the upper and lower chambers and designed for location of the pictures or films, a pair of normally inactive mirrors located at the sides of the lower chamber, and hand operated crank means for moving said mirrors in parallel gradually through inclined positions to accomplish the result stated.

In testimony whereof I affix my signature, in presence of two witnesses.

SHERRY McAULEY.

Witnesses:
 CHAS. C. LITTLE,
 W. E. FRANKLIN.